(12) United States Patent
Mueller

(10) Patent No.: US 10,137,842 B2
(45) Date of Patent: Nov. 27, 2018

(54) CAMERA SYSTEM FOR A VEHICLE

(75) Inventor: Gerhard Mueller, Bad Waldsee (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 259 days.

(21) Appl. No.: 14/115,743

(22) PCT Filed: May 2, 2012

(86) PCT No.: PCT/DE2012/100122
§ 371 (c)(1),
(2), (4) Date: Nov. 5, 2013

(87) PCT Pub. No.: WO2012/163341
PCT Pub. Date: Dec. 6, 2012

(65) Prior Publication Data
US 2014/0300738 A1    Oct. 9, 2014

(30) Foreign Application Priority Data

Jun. 3, 2011 (DE) .................. 10 2011 103 302

(51) Int. Cl.
| | |
|---|---|
| H04N 7/18 | (2006.01) |
| B60R 11/04 | (2006.01) |
| G03B 15/04 | (2006.01) |
| G03B 17/02 | (2006.01) |
| G03B 19/02 | (2006.01) |
| H04N 5/225 | (2006.01) |
| B60S 1/08 | (2006.01) |

(Continued)

(52) U.S. Cl.
CPC ............ B60R 11/04 (2013.01); B60S 1/0844 (2013.01); G03B 15/04 (2013.01); G03B 17/02 (2013.01); G03B 19/023 (2013.01); G06K 9/00791 (2013.01); H04N 5/2256 (2013.01); H04N 5/2257 (2013.01); B60R 2011/0026 (2013.01); G03B 2217/002 (2013.01)

(58) Field of Classification Search
CPC ..... B60S 1/0844; B60S 1/0822; B60S 1/0833
USPC ........................................ 348/148
See application file for complete search history.

(56) References Cited

U.S. PATENT DOCUMENTS

| | | | |
|---|---|---|---|
| 4,515,443 | A | 5/1985 | Bly |
| 4,741,605 | A | 5/1988 | Alfredsson et al. |

(Continued)

FOREIGN PATENT DOCUMENTS

| | | |
|---|---|---|
| CN | 101037099 A | 9/2007 |
| CN | 101384458 A | 3/2009 |

(Continued)

OTHER PUBLICATIONS

International Search Report of the International Searching Authority for International Application PCT/DE2012/100122, dated Oct. 4, 2012, 3 pages, European Patent Office, HV Rijswijk, Netherlands.

(Continued)

Primary Examiner — Tat C Chio
Assistant Examiner — Fabio S Lima
(74) Attorney, Agent, or Firm — W. F. Fasse

(57) ABSTRACT

A camera system for a vehicle, which is to be arranged inside the vehicle behind a windshield of the vehicle, includes a housing, a first camera module that detects or images an area ahead of the vehicle and a second camera module that detects or images at least an area of the windshield.

23 Claims, 4 Drawing Sheets

(51) Int. Cl.
  *G06K 9/00* (2006.01)
  *B60R 11/00* (2006.01)

(56) References Cited

U.S. PATENT DOCUMENTS

| | | | |
|---|---|---|---|
| 5,923,027 | A | 7/1999 | Stam et al. |
| 5,987,152 | A | 11/1999 | Weisser |
| 6,137,529 | A | 10/2000 | Kunimitsu et al. |
| 6,331,819 | B1 | 12/2001 | Hog |
| 6,376,824 | B1 | 4/2002 | Michenfelder et al. |
| 6,392,218 | B1 | 5/2002 | Kuehnle |
| 6,452,148 | B1 | 9/2002 | Bendicks et al. |
| 6,555,804 | B1 | 4/2003 | Biasing |
| 6,614,015 | B1 | 9/2003 | Ba et al. |
| 6,617,564 | B2 * | 9/2003 | Ockerse ............... B60S 1/0818 250/208.1 |
| 6,841,767 | B2 | 1/2005 | Mindl et al. |
| 6,968,073 | B1 | 11/2005 | O'Boyle et al. |
| 7,208,962 | B2 | 4/2007 | Sun et al. |
| 7,253,898 | B2 | 8/2007 | Saikalis et al. |
| 7,259,367 | B2 | 8/2007 | Reime |
| 7,609,857 | B2 | 10/2009 | Franz |
| 7,612,356 | B2 | 11/2009 | Utida et al. |
| 7,646,889 | B2 | 1/2010 | Tsukamoto |
| 7,855,353 | B2 | 12/2010 | Blaesing et al. |
| 7,863,568 | B2 | 1/2011 | Fleury |
| 8,274,562 | B2 | 9/2012 | Walter et al. |
| 8,541,732 | B2 | 9/2013 | Rothenhaeusler |
| 8,913,132 | B2 | 12/2014 | Seger et al. |
| 2001/0043624 | A1 | 11/2001 | Saito et al. |
| 2002/0003571 | A1 | 1/2002 | Schofield et al. |
| 2002/0081029 | A1 | 6/2002 | Marugame |
| 2002/0148987 | A1 | 10/2002 | Hochstein |
| 2003/0066955 | A1 | 4/2003 | Schaub et al. |
| 2003/0138133 | A1 | 7/2003 | Nagaoka et al. |
| 2003/0201380 | A1 | 10/2003 | Ockerse et al. |
| 2004/0004456 | A1 | 1/2004 | LeBa et al. |
| 2004/0164981 | A1 | 8/2004 | Fujita et al. |
| 2004/0165749 | A1 | 8/2004 | Holz et al. |
| 2005/0035926 | A1 | 2/2005 | Takenaga et al. |
| 2005/0063071 | A1 | 3/2005 | Wang et al. |
| 2005/0178954 | A1 | 8/2005 | Yukawa |
| 2005/0206511 | A1 | 9/2005 | Heenan et al. |
| 2005/0231725 | A1 | 10/2005 | Franz |
| 2005/0254688 | A1 | 11/2005 | Franz |
| 2006/0076477 | A1 | 4/2006 | Ishikawa |
| 2006/0163458 | A1 | 7/2006 | Reime |
| 2006/0191215 | A1 | 8/2006 | Stark |
| 2007/0075220 | A1 | 4/2007 | Kotani |
| 2007/0115357 | A1 * | 5/2007 | Stein ............... B60Q 1/0023 348/148 |
| 2007/0216768 | A1 * | 9/2007 | Smith ............... B60J 1/02 348/118 |
| 2007/0267993 | A1 | 11/2007 | Leleve et al. |
| 2007/0268470 | A1 | 11/2007 | Shibazaki |
| 2008/0027607 | A1 | 1/2008 | Ertl et al. |
| 2008/0049344 | A1 | 2/2008 | DeWard et al. |
| 2008/0185603 | A1 | 8/2008 | Itoi et al. |
| 2008/0265134 | A1 | 10/2008 | Kinoshita |
| 2008/0296577 | A1 | 12/2008 | Yuan et al. |
| 2009/0085755 | A1 * | 4/2009 | Schafer ............... B60R 11/04 340/602 |
| 2009/0122138 | A1 | 5/2009 | Bischoff et al. |
| 2009/0122179 | A1 * | 5/2009 | Nomura ............... H04N 5/2257 348/340 |
| 2009/0128629 | A1 | 5/2009 | Egbert et al. |
| 2009/0201366 | A1 | 8/2009 | Sase et al. |
| 2010/0133419 | A1 * | 6/2010 | Suetake ............... H01L 27/14618 250/208.1 |
| 2010/0208060 | A1 * | 8/2010 | Kobayashi ............... B60S 1/0844 348/135 |
| 2011/0031921 | A1 | 2/2011 | Han |
| 2011/0043624 | A1 | 2/2011 | Haug |
| 2011/0128543 | A1 | 6/2011 | Choi |
| 2011/0204206 | A1 | 8/2011 | Taoka |
| 2011/0253917 | A1 * | 10/2011 | Rothenhaeusler ............... G06K 9/00791 250/578.1 |
| 2011/0273564 | A1 | 11/2011 | Seger et al. |
| 2012/0026318 | A1 | 2/2012 | Huelsen et al. |
| 2012/0026330 | A1 | 2/2012 | Huelsen et al. |
| 2012/0033079 | A1 * | 2/2012 | Karl ............... B60R 11/04 348/148 |
| 2012/0153154 | A1 | 6/2012 | Rothenhaeusler et al. |
| 2013/0235381 | A1 | 9/2013 | Kroekel et al. |
| 2014/0321709 | A1 | 10/2014 | Kasahara et al. |
| 2015/0034827 | A1 | 2/2015 | Kroekel |
| 2015/0070499 | A1 * | 3/2015 | Roelke ............... G03B 15/00 348/148 |
| 2015/0220792 | A1 | 8/2015 | Strauss et al. |

FOREIGN PATENT DOCUMENTS

| | | |
|---|---|---|
| CN | 101896375 A | 11/2010 |
| DE | 44 17 385 | 11/1995 |
| DE | 195 04 606 | 8/1996 |
| DE | 197 04 818 | 8/1997 |
| DE | 202 07 170 | 8/2002 |
| DE | 102 30 200 | 1/2004 |
| DE | 197 00 665 | 7/2004 |
| DE | 103 03 046 | 10/2004 |
| DE | 103 16 794 | 11/2004 |
| DE | 103 22 010 | 12/2004 |
| DE | 103 55 205 | 7/2005 |
| DE | 102004015040 | 10/2005 |
| DE | 102004037871 | 3/2006 |
| DE | 102005004513 | 3/2006 |
| DE | 102006008274 | 8/2007 |
| DE | 102006010671 | 9/2007 |
| DE | 102007012993 | 9/2007 |
| DE | 102006022404 | 11/2007 |
| DE | 102007061725 | 6/2009 |
| DE | 102008043737 | 5/2010 |
| EP | 0 832 798 | 4/1998 |
| EP | 1 580 092 | 9/2005 |
| EP | 1580092 A2 * | 9/2005 ............... B60R 1/00 |
| EP | 1 764 835 | 3/2007 |
| EP | 1 923 280 | 5/2008 |
| EP | 1 923 695 | 5/2008 |
| JP | S57-004133 A | 1/1982 |
| JP | S60-125260 U | 8/1985 |
| JP | H04-061379 A | 2/1992 |
| JP | H11-234474 A | 8/1999 |
| JP | 2003-315256 A | 11/2003 |
| JP | 2005-292544 | 10/2005 |
| JP | 2006-184844 | 7/2006 |
| JP | 2008-522891 A | 7/2008 |
| JP | 2009-092453 A | 4/2009 |
| JP | 2009-098477 A | 5/2009 |
| JP | 2010-096604 A | 4/2010 |
| JP | 2010-103810 A | 5/2010 |
| JP | 2010-204059 A | 9/2010 |
| WO | WO 03/029757 | 4/2003 |
| WO | WO 05/075248 | 8/2005 |
| WO | WO 06/015905 | 2/2006 |
| WO | WO 06/024247 | 3/2006 |
| WO | WO 06/121954 | 11/2006 |
| WO | WO 09/020918 | 2/2009 |
| WO | WO 2011/003381 | 1/2011 |
| WO | WO 2011000746 A1 * | 1/2011 ............... B60R 11/04 |
| WO | WO 2011026584 A1 * | 3/2011 ............... B60R 11/04 |

OTHER PUBLICATIONS

PCT International Preliminary Report on Patentability including English Translation of PCT Written Opinion of the International Searching Authority for International Application PCT/DE2012/100122, dated Dec. 19, 2013, 7 pages, International Bureau of WIPO, Geneva, Switzerland.

German Search Report for German Application No. 10 2011 103 302.9, dated Mar. 29, 2012, 5 pages, Muenchen, Germany, with English translation, 5 pages.

(56) References Cited

OTHER PUBLICATIONS

English Translation of Chinese Office Action in Chinese Patent Application No. 201280025522.6, dated Nov. 24, 2015, 8 pages.
English Translation of Japanese Office Action in Japanese Patent Application No. 2014-513051, dated Mar. 30, 2016, 4 pages.
Chinese Office Action and Search Report in Chinese Patent Application No. 201280025522.6, dated Jan. 23, 2017, 5 pages, with English translation, 4 pages.
Partial English translation of Japanese Office Action in Japanese Patent Application No. 2014-513051, dated Dec. 7, 2016, 2 pages.

* cited by examiner

CAMERA SYSTEM FOR A VEHICLE

CROSS-REFERENCE TO RELATED APPLICATIONS

This application is the 35 USC 371 National Stage of PCT International Application PCT/DE2012/100122 as filed on 2 May 2012, and claims the 35 USC 119 priority of German Patent Application 10 2011 103 302.9 as filed on 3 Jun. 2011. The entire disclosures of the PCT International Application and of the German Patent Application are incorporated herein by reference.

FIELD OF THE INVENTION

The invention relates to a camera system for a vehicle, which is arranged inside the vehicle behind a windshield.

BACKGROUND INFORMATION

Driver assistance systems in vehicles often use a camera to scan or image or detect the surroundings of the vehicle, for example in order to detect various kinds of objects in the area around the vehicle. As a rule, the camera is arranged behind the windshield of the vehicle and looks through the windshield in the direction of travel. Examples are vehicle cameras for the detection of road surface markings, night vision cameras or stereo cameras used as optical distance sensors. Typically, additional sensors for rain detection or sensors designed to detect the lighting conditions are located next to the installation space of such a camera system.

For example, DE 103 55 205 A1 discloses a device for mounting a camera module behind a windshield in a vehicle, wherein a camera module designed to record images of the area ahead of the vehicle is arranged in a first installation space behind the windshield. A second installation space for a rain sensor, whose sensor surface also faces the windshield, is provided underneath the installation space for the camera module.

The device described in DE 103 55 205 A1 as well as other known devices where several sensors, in particular camera modules and rain or light sensors, are arranged behind a windshield of a vehicle have the drawback that each camera module and each sensor unit needs its own area of view through the windshield, so that they require much installation space, which is available only to a limited extent.

There have been attempts to combine several sensor functions in one camera module, for example by using bifocal or multifocal camera modules, i.e. cameras that are able to record images from a far range and a near range on a single image recording element. Such a system is known, for example, from EP 1 923 280 A1. An additional optical element including a positive lens (convex lens) enables an existing imaging system, which is focused on a far range of vision, to project an additional clear image of objects from a near range of vision, in this case raindrops on a windshield, on to an image recording element. When there are no raindrops on the windshield, the image projected on to the image recording element is exclusively dominated by the far range of vision. When there are drops on the windshield, the near-range image will be superimposed on the far-range image in the same image plane, modifying the generated image signal.

The system described in EP 1 923 280 A1 as well as other multifocal imaging systems from the state of the art have the drawback that radiation from a near range of vision as well as from a far range of vision is incident, and generates an image signal, on a shared area of the image recording element at the same time. Due to the radiation from both monitoring areas being superimposed on each other, the image quality decreases for both driver assistance functions, i.e. far-range monitoring and near-range monitoring.

SUMMARY OF THE INVENTION

Therefore, it is an object of the invention to provide a sensor or a camera system that can be arranged behind the windshield of a vehicle in a compact and cost-efficient manner and that is able to perform several sensor functions at the same time, in particular a function of recording images of a surrounding area ahead of the vehicle as well as a rain and/or light sensor function.

The aforesaid object is achieved by a camera system having the features according to one or more embodiments of the invention as set forth herein. Advantageous configurations and further developments are set out in the subclaims; combinations and further developments of individual features in conjunction with each other are also possible.

It is an underlying idea of one or more embodiments of the invention that the same installation space provided for a first (primary) camera module, which scans (i.e. images, views, senses, detects or monitors) the vehicle's surroundings, is used to arrange a second (secondary) camera module, which is in particular designed to scan (i.e. image, view, sense, detect or monitor) an area of the windshield of the vehicle, e.g. for rain detection and/or as a light sensor. In a particular configuration or embodiment, the second camera module is arranged in the camera system in such a manner that its direction of view is through a lens hood for the first camera module. As a result, a shared installation space for several camera modules or sensor functions is used in a space-saving manner.

The camera system according to an embodiment of the invention, including a housing, can be arranged inside a vehicle, in particular behind the windshield of the vehicle, for example behind an area of the windshield cleared by a windshield wiper. Said camera system comprises a first camera module including an objective and an image recording element, wherein the first camera module is arranged in the housing in such a manner that it scans or detects or images an outside surrounding area ahead of the vehicle through the windshield, in particular an area ahead of the vehicle in the direction of travel. The image recording element of the first camera module is arranged on a printed circuit board, preferably at right angles to the optical axis of the objective of the first camera module, wherein the optical axis of the objective may, for example, be arranged parallel to the longitudinal axis of the vehicle in the direction of travel.

The camera system according to an embodiment of the invention further comprises at least one second camera module, which may have a similar structure as the first camera module or comprise the same or similar elements and which is arranged in the housing in such a manner that the second camera module scans a part of the windshield, in particular the outer side of an area of the windshield. Preferably, the second camera module is an optical device whose structure is simpler and/or more compact than that of the first camera module and which is preferably pre-assembled, so that it can be directly installed on a printed circuit board. The second camera module may, for example, be arranged on the computing circuit board of the first camera module or next to the first camera module on the same camera circuit board.

In a preferred configuration or embodiment, the camera system comprises at least one lens hood. The lens hood is arranged on the housing of the camera system, preferably so as to serve the first camera module, in particular to avoid reflections on the windshield and/or on elements of the camera system, e.g. on lenses, housing and/or frame parts, caused by light or electromagnetic radiation entering the camera system from the side, i.e. in particular from outside the area of view of the first camera module. The lens hood may, for example, be arranged horizontally or at a certain angle of inclination to and below the optical axis of the first camera module. In particular if the camera system is equipped with a lens hood for the first camera module, the second camera module is preferably arranged in such a manner that its direction of view is through the lens hood towards the windshield, in particular looking upwards to the area of the window pane the first camera module looks through. Preferably, the direction of view of the second camera module and the optical axis of the first camera module cross or intersect each other in an area between the housing and the windshield.

In another preferred configuration or embodiment, the lens hood is arranged in an area between the housing and the windshield, preferably within the "funnel of view" of the first camera module.

In an advantageous configuration or embodiment of the camera system according to the invention, the first and the second camera module are designed in such a manner that the first and the second camera module detect electromagnetic radiation from different wavelength ranges. For this purpose, the first and the second camera module may, for example, be equipped with different wavelength filters and/or each of them may be equipped with an image recording element including a wavelength filter.

In another advantageous configuration or embodiment, the camera system comprises at least one active light. Said active light emits electromagnetic radiation, in particular of a defined wavelength range and preferably into one of the areas of detection of the first and/or the second camera module. The wavelength range of the electromagnetic radiation emitted by said at least one active light preferably corresponds to a wavelength range that is detected only by the first or only by the second camera module. The at least one active light or the electromagnetic radiation emitted by said light may also be transferred into the windshield through optical waveguides.

In a preferred configuration or embodiment, the at least one active light is arranged next to the second camera module in such a manner that its direction of emission is through the lens hood for the first camera module towards the windshield. Said active light preferably emits electromagnetic radiation of a defined wavelength range into the area of detection of the second camera module. This wavelength range is preferably a range that is not detected by the first camera module, for example within the infrared range. Said second camera module can be designed to detect only electromagnetic radiation from the wavelength range emitted by the active light.

In an advantageous configuration or embodiment, the camera system is designed in such a manner that the second camera module and/or the at least one active light detects or emits electromagnetic radiation through an aperture in the lens hood. In particular if the second camera module and the active light are arranged next to each other, their directions of detection and emission being essentially the same, the lens hood can be provided with an individual aperture for each of the second camera module and the active light or with a shared aperture for the camera module and the active light. Said individual or shared aperture(s) is/are preferably adapted to the desired angular aperture of the cone of view of the second camera module and/or the angle of emission of the active light in each case.

In another advantageous configuration or embodiment of the camera system according to the invention, at least one optical element, for example a lens and/or a wavelength filter, is arranged in at least one aperture of the lens hood the second camera module and/or the at least one active light use(s) for detection and emission. The optical element may serve to control the direction of view of the second camera module by means of beam deflection or beam shaping and/or to adapt said direction of view to the inclination of the window pane and/or to protect the second camera module against dirt. If a wavelength filter is arranged as the optical element in the aperture, said wavelength filter preferably ensures that the second camera module only detects electromagnetic radiation from a defined wavelength range and/or that the at least one active light only emits electromagnetic radiation from a defined wavelength range.

In a preferred configuration or embodiment, the camera system is designed in such a manner that the second camera module and/or the at least one active light detects or emits electromagnetic radiation through a portion of the lens hood that is designed to allow electromagnetic radiation to pass through or to transmit electromagnetic radiation. In particular if the second camera module and the active light are arranged next to each other, their directions of detection and emission being essentially the same, the lens hood can be provided with an individual transmitting portion for each of the second camera module and the active light or with a shared transmitting portion for the second camera module and the active light. Said individual or shared portion(s) is/are preferably adapted to the desired angular aperture of the cone of view of the second camera module and the angle of emission of the at least one active light in each case.

In another preferred configuration or embodiment of the camera system according to the invention, at least one of the portions of the lens hood that are designed to allow electromagnetic radiation to pass through and are used by the second camera module and/or the at least one active light for detection and emission, is designed in such a manner that the at least one portion allows only electromagnetic radiation from a defined wavelength range to pass through or transmits only such electromagnetic radiation. The at least one portion can thus be designed as a wavelength filter for the second camera module and/or the active light.

In a specific embodiment of the camera system according to the invention, the first and the second camera module are arranged on a shared printed circuit board. Preferably, said printed circuit board is a flexible printed circuit board including a first planar area, which is in particular arranged at right angles to the optical axis of the first camera module, a second planar area, which is arranged in particular below and essentially parallel to the lens hood, and a curved area connecting the first and the second planar area. In this case, the first camera module is preferably arranged on the first planar area and the second camera module is preferably arranged on the second planar area of the flexible printed circuit board. If the camera system is provided with at least one active light, said light may, for example, be arranged next to the second camera module on the second planar area of the flexible printed circuit board.

In an advantageous embodiment of the camera system according to the invention, the first camera module is arranged on a first printed circuit board and the second camera module is arranged on a second printed circuit board. Said first printed circuit board is preferably aligned at right angles to the optical axis of the first camera module and the second printed circuit board is aligned below and essentially parallel to the lens hood of the camera system, so that the first and the second printed circuit board, including the first and second camera modules arranged thereon, are arranged in the housing at a defined angle to each other, preferably at an angle larger than 90° and smaller than 135°. Thus, the optical axes of the two camera modules preferably cross each other at an angle greater than 45° and less than 90° facing toward the windshield. Said first and second printed circuit boards are preferably connected to each other by means of flexible contacts.

In a specific embodiment of the camera system according to the invention, the second camera module is integrated in the lens hood. This serves to achieve a modular structural concept for the camera system in a simple and advantageous manner, in particular in order to add a light and/or rain sensor function to an existing camera designed to scan the surroundings by clipping on or suitably arranging the lens hood. If the lens hood is arranged in the housing of the camera system, a mechanical connection is preferably made between the lens hood and the housing in which the camera system is arranged, and an electrical connection between the second camera module and the printed circuit board on which the first camera module is arranged. The mechanical connection may, for example, be achieved by means of snap-lock devices or using other connecting technologies, for example gluing. The electrical connection is preferably made by means of electrical plug contacts. The electronic systems and technical components serving the first camera module can also be used for the second camera module, specifically as an evaluation unit and as an interface to other electronic systems of the vehicle.

In an advantageous embodiment of the camera system according to the invention, the image data recorded by the first and the second camera module is processed by the same, i.e. shared, electric and electronic components, in particular within the camera system.

In a specific configuration of the camera system according to the invention, the second camera module or the direction of view of the second camera module and its optical axis are aligned in such a manner that the direction of view of the second camera module is not at right angles to the windshield of the vehicle or to the area of the windshield that is scanned by the second camera module. "Direction of view at right angles" means in particular that the optical axis of the second camera module is aligned at an angle of 90° to the tangent, i.e. the perpendicular, of the curve of the pane at the point of intersection between the optical axis and the windshield. The second camera module is preferably designed with a different alignment. As a result, there are different distances, in particular of an image recording element of the second camera module, from the windshield, so that only a portion of the overall scanned area of the windshield is recorded as a focused or clear image by the second camera module or on its image recording element. This can advantageously be used to ensure that a portion of the overall scanned area of the windshield will always be recorded as a focused image, even in case of poor or inaccurate focus of the second camera module. Another particular advantage of this configuration is, for example, that a lack of focus/adjustment of the second camera module, for example due to temperature changes and/or material expansion, is compensated for, as the area recorded as a focused image will just move. To detect rain, for example, it is usually sufficient if just a small portion is recorded as a focused image.

In a particularly advantageous configuration or embodiment of the camera system of the invention, the second camera module functions in a wavelength range that cannot be detected by the first camera module. In this case, the lens hood can be made of a material that allows the wavelength range of the second camera module to pass through or transmits said wavelength range. The wavelength range that can be detected by the first camera module might be absorbed by this material. Furthermore, the entire housing of the camera system can be made of such a material in this case, and the lens hood be formed directly on the housing.

Further advantages and optional configurations or embodiments of the invention can be seen from the description and the drawings. Exemplary embodiments are shown in the drawings in a simplified manner and explained in more detail in the description below.

DETAILED DESCRIPTION OF EXAMPLE EMBODIMENTS OF THE INVENTION

Figure 1:
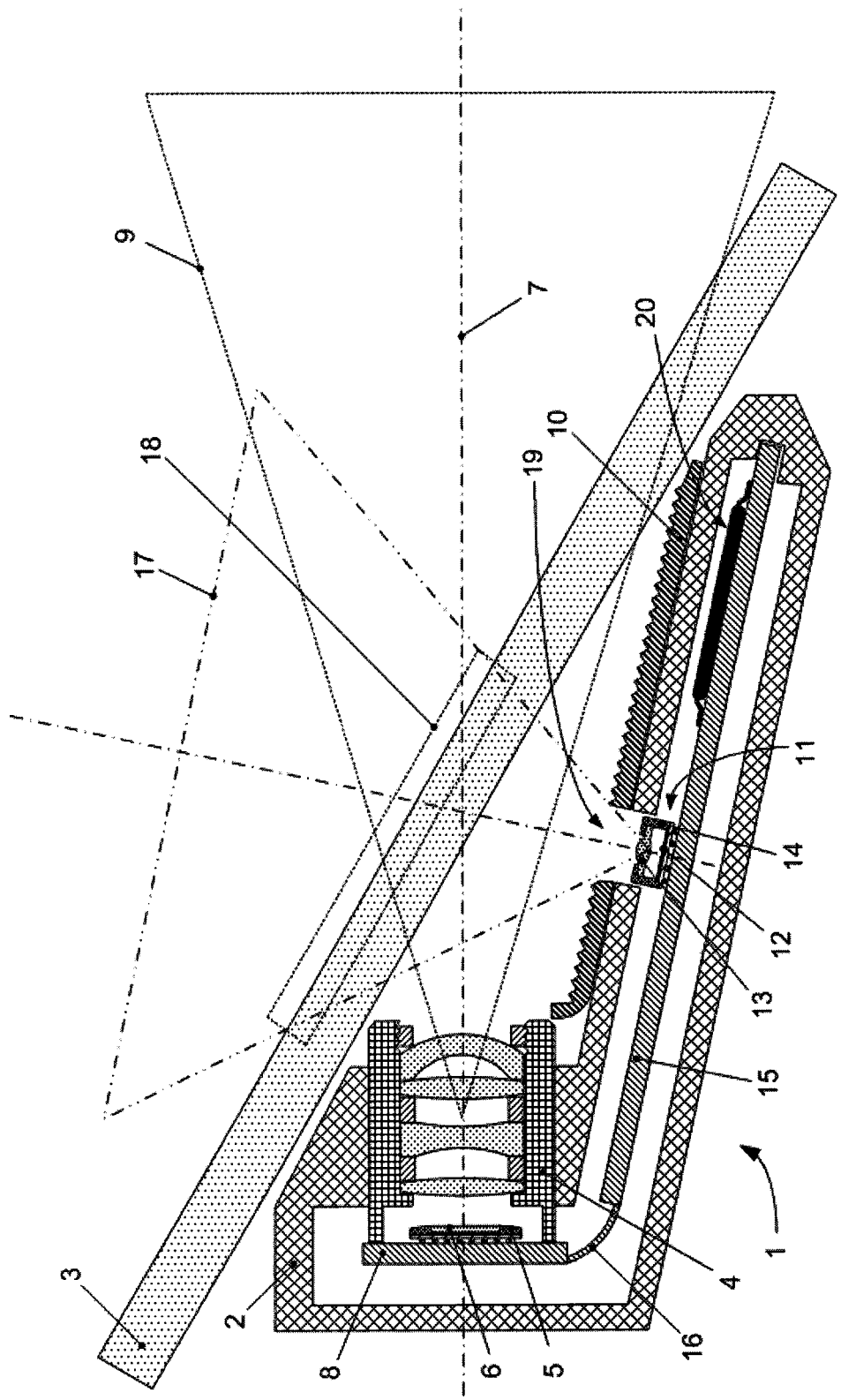
FIG. 1 shows a camera system according to an embodiment of the invention in a configuration including a lens hood and an aperture in the lens hood.

FIG. 1 shows an example of a camera system 1 according to the invention, which includes a housing 2 and is arranged behind the windshield 3 of a vehicle. The camera system 1 comprises a first camera module including an objective 4 and an image recording element 5. In this case, the objective 4 comprises several lens elements and is arranged on a printed circuit board 8 in the housing 2. Said image recording element 5 is an imager, for example a CCD or CMOS imager, in this case. The image recording element 5 comprises a surface 6 that is sensitive to electromagnetic radiation, and is arranged on the printed circuit board 8 at right angles to the optical axis 7 of the objective 4 using BGA technology (BGA package, ball grid array). The first camera module, including the objective 4 and the image recording element 5, is aligned in such a manner that its direction of view or cone of view 9 is through the windshield 3 in the direction of travel of the vehicle. The optical axis 7 of said first camera module or of said objective 4 is arranged substantially parallel to the longitudinal axis of the vehicle, the expression "substantially" including a possible variation within the range of +/−30°. The first camera module serves, for example, to scan an area ahead of the vehicle, for example in order to detect lanes, traffic signs, traffic light systems, other objects and obstacles and/or pedestrians and other road users, e.g. for one or more driver assistance system(s) such as traction control such as ABS (anti-lock braking system), TCS (traction control system), ESC (electronic stability control), EDL (electronic differential lock), as well as adaptive forward lighting, high/low beam assistant for the headlights, night vision systems, cruise control, parking assistant, braking assistant, ACC (adaptive cruise control), distance alert, turning assistant, congestion assistant, lane detection system, lane departure warning, lane keeping support, lane change assistant, ISA (intelligent speed adaptation), EBA (emergency brake assistant), bend assistant, tire pressure monitoring system, driver drowsiness detection, traffic sign detection, platooning.

According to FIG. 1, the camera system 1 further comprises a lens hood 10, which is arranged between the housing 2 and the windshield 3 at a small angle of inclination to and below the optical axis 7 of the first camera module. The lens hood 10 is basically sheet-shaped and provided with a teethed surface structure facing the windshield 3 in this case, which serves to prevent stray light from entering the first camera module or the objective 4, for example due to the fact that light incident from the side is reflected on the windshield 3 and/or on elements of the camera system 1.

The camera system 1 further comprises a second camera module 11. According to the invention, the second camera module 11 can have the same or a similar structure as the first camera module. In this case, the second camera module comprises an image recording element 12, a lens 13 and a retaining structure 14 for the lens 13. The retaining structure 14 and the lens 13 thus form an objective, which is connected to the image recording element 12 of the second camera module 11 and arranged on a printed circuit board 15. The printed circuit board 15 is arranged below and parallel to the lens hood 10 within the housing 2 and connected by means of flexible contacts 16 to the printed circuit board 8, which is aligned at right angles to the optical axis 7 of the first camera module in the housing 2 and on which the first camera module is arranged. The image recording element 12 of the second camera module 11 may, for example, be provided with an integrated wavelength filter, so that in an advantageous configuration of the camera system 1 the second camera module 11 detects only electromagnetic radiation from a defined wavelength range.

Said second camera module 11 is arranged in the camera system 1 in such a manner that its direction of view or cone of view 17 is through the lens hood 10 and it scans a part or an area 18 of the windshield 3, in this case an area 18 of the outer side of the windshield 3. Said second camera module 11 may serve, for example, to detect rain or raindrops and/or be designed as a light sensor. Said second camera module 11 looks through an aperture 19 in the lens hood 10 and in the housing 2 towards the windshield 3.

Further technical or electronic components, for example semiconductor devices 20, may be arranged on the printed circuit boards 8 and 15, in particular for performing image processing tasks. Preferably, the first camera module and the second camera module 11 make shared use of electronic components 20 for processing recorded image data.

Figure 2:
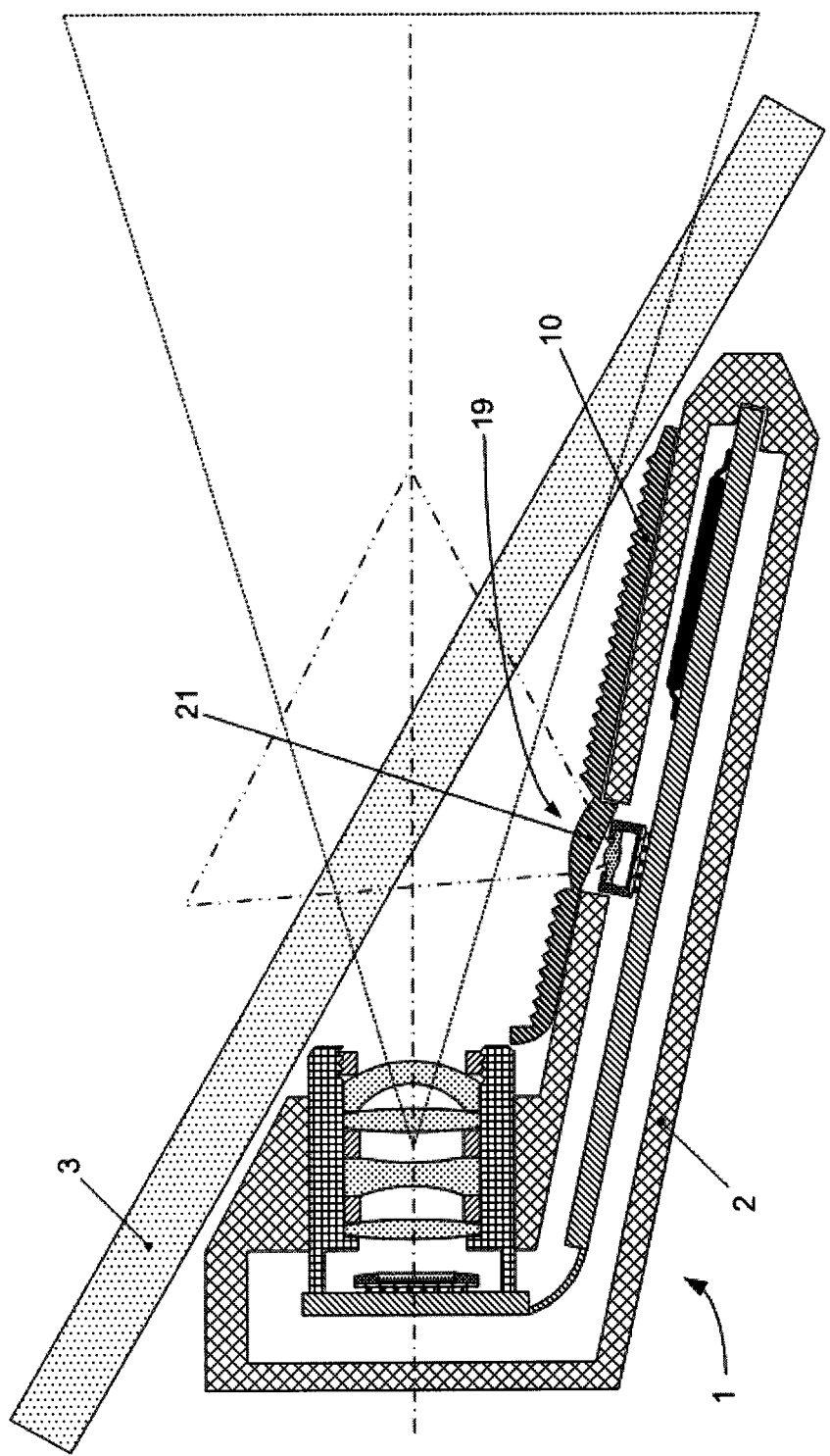
FIG. 2 shows a camera system according to an embodiment of the invention in a configuration including an optical element in the aperture of the lens hood.

FIG. 2 shows another example of a camera system 1 according to the invention, which is arranged behind a windshield 3. The camera system 1 of FIG. 2 has basically the same structure described with reference to FIG. 1. In contrast to FIG. 1, the camera system 1 of FIG. 2 includes an optical element 21 that is arranged in the aperture 19 in the lens hood 10 and in the housing 2. In this specific case, said optical element 21 is formed as part of the lens hood 10 and may, for example, be made of another material than the remaining part of the lens hood 10, for example with special refractive properties and/or optical filter properties. The optical element 21 may thus serve as a lens or a beam shaping element and/or as a beam directing element and/or as a wavelength filter for the electromagnetic radiation entering the second camera module 11. FIG. 2 shows a wedge-shaped lower side of the optical element 21, which improves the direction of view 17 of the second camera module 11 towards the windshield 3, and a lens-shaped upper side of the optical element 21, which provides additional focus. If the optical element 21 has filter properties, said optical element can in particular serve as a wavelength filter for the second camera module 11, so that according to an advantageous configuration of the camera system 1 according to the invention, the camera module 11 detects only electromagnetic radiation from a defined wavelength range.

Figure 3:
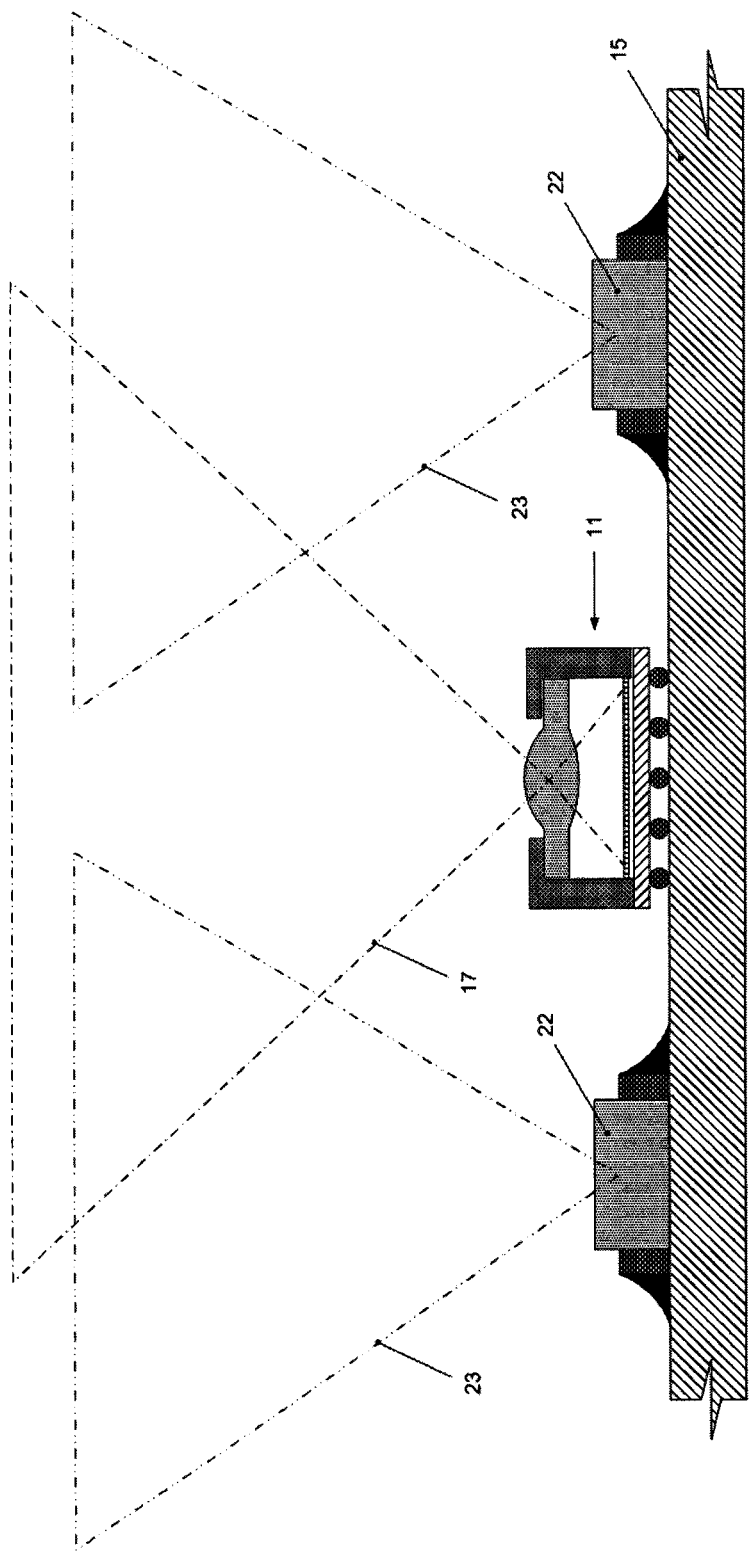
FIG. 3 shows a printed circuit board on which the second camera module and two active lights are arranged.

FIG. 3 shows a printed circuit board 15 on which the second camera module 11 may be arranged. Preferably, said printed circuit board 15 is arranged below the lens hood 10 in the housing 2 of the camera system 1, as shown in FIGS. 1 and 2. In addition to the second camera module 11, two active lights 22, for example light-emitting diodes (e.g. LEDs or OLEDs), are arranged on the printed circuit board 15 of FIG. 3. Said active lights 22 serve to emit 23 electromagnetic radiation, preferably from a defined wavelength range, into the area of detection of the second camera module 11, preferably an area 18 of a windshield 3. The second camera module 11 may in particular be designed to detect only electromagnetic radiation from a defined wavelength range as well. Preferably, the wavelength ranges of the electromagnetic radiation that is detected by the second camera module 11 and emitted by the active lights 22 is electromagnetic radiation from the same wavelength range.

Figure 4:
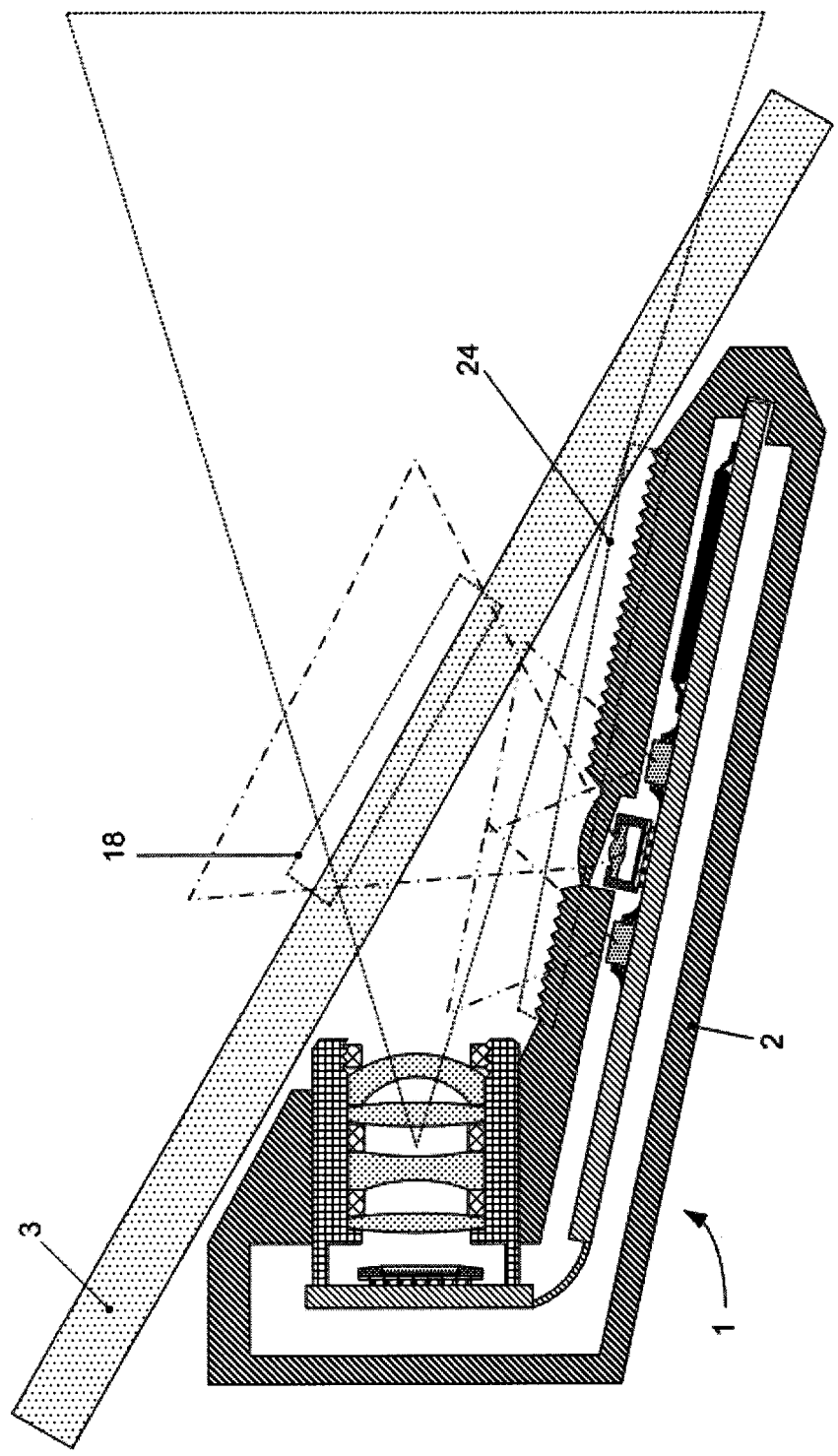
FIG. 4 shows a camera system according to an embodiment of the invention in a configuration including an active light, a housing made of a translucent material and a lens hood integrated in the housing.

FIG. 4 shows another example of a camera system 1 according to the invention, which is arranged behind a windshield 3 of a vehicle. Said camera system 1 of FIG. 4 has basically the same structure described with reference to FIGS. 1 and 2. In this case, the lens hood 10 and the housing 2 of the camera system 1 are designed as one part or as a combined element. At least parts of an area 24 acting as a lens hood is designed to allow electromagnetic radiation to pass through, for example electromagnetic radiation from a defined wavelength range. Preferably, the entire housing of FIG. 4 can be made of the same translucent material. A printed circuit board 15 as described with reference to FIG. 3, which is provided with a second camera module 11 and two active lights, is arranged below the area 24 acting as a lens hood. An optical element 21 is formed in the area 24 of the housing 2, in the area where the electromagnetic radiation entering the second camera module 11 passes through. The housing area 24 acting as a lens hood may function as a wavelength filter for the active lights 22 and/or for the second camera module 11 in the areas that allow electromagnetic radiation to pass through, so that the active lights 22 emit only electromagnetic radiation from a defined wavelength range into the area of detection 18 of the second camera module 11 and that the second camera module 11 detects only electromagnetic radiation from a defined wavelength range, in particular from the same wavelength range emitted by the lights 22. The material of the housing 2, in particular in the area 24 acting as a lens hood, may, for example, be selected such that the active lights 22 and the second camera module 11 function in the infrared range.

Instead of the separate printed circuit boards 8 and 15 including flexible contacts 16 or a flexible area between two rigid areas, according to FIG. 1, FIG. 2 and FIG. 4, the first camera module and the second camera module 11 might also be arranged on a shared printed circuit board, in particular on a flexible printed circuit board (Flex PCB). In this case, the flexible printed circuit board might comprise a first planar area that is aligned at right angles to the optical axis 7 of the objective 4 of the first camera module and on which the first camera module is arranged, a second planar area that is arranged below the lens hood 10 in the housing 2 of the camera system 1 and on which the second camera module 11, preferably including active lights 22, is arranged, and a curved area that connects the first and the second planar area.

As repeatedly described above, the first camera module and the second camera module 11 may be designed in such a manner that each of them detects only electromagnetic radiation from a defined wavelength range, and the at least one active light 22 designed to emit electromagnetic radiation, in particular into the area of detection of the second camera module 11, may also be designed in such a manner that it emits only electromagnetic radiation from a defined wavelength range. In general, possible wavelength ranges include all spectral ranges that can be differentiated from each other by means of a wavelength filter or spectral filter.

Preferably, said first and said second camera module 11 are designed in such a manner that each of them detects electromagnetic radiation from different wavelength ranges, while in particular being "blind" to the wavelength range of the other camera module. It is particularly advantageous if, for example, the second camera module 11 and the active light 22 function only in the infrared range, i.e. within the spectral range above 780 nm, whereas the first camera module detects only "visible" light, for example in a spectral range below 780 nm, so that the electromagnetic radiation emitted by the active light 22 improves detection by the second camera module 11, in particular if visibility is low, while the active light 22 does not interfere with detection by the first camera module.

LIST OF REFERENCE NUMERALS

1 Camera system
2 Housing
3 Windshield
4 Objective
5 Image recording element (first camera module)
6 Sensitive area
7 Optical axis
8 Printed circuit board
9 Cone of view/direction of view (first camera module)
10 Lens hood
11 Second camera module
12 Image recording element (second camera module)
13 Lens
14 Retaining structure
15 Printed circuit board
16 Flexible contacts
17 Cone of view/direction of view (second camera module)
18 (Outer) area of the windshield
19 Recess
20 Semiconductor device
21 Optical element
22 Active light
23 Emission (of the active light)
24 Area acting as a lens hood

The invention claimed is:

1. A camera system for a vehicle, which is to be arranged inside the vehicle behind a windshield of the vehicle, said camera system comprising:
   a housing,
   a first camera module including an objective and an image recording element, wherein the first camera module has a first optical axis and a first field of view oriented through the windshield, and is focused on, and configured and arranged to detect, an outside area ahead of the vehicle in the first field of view of the first camera module,
   a second camera module that is focused on at least a focused portion of, and configured and arranged to detect, a detected area of the windshield covered by a second field of view of the second camera module, and
   at least one lens hood for the first camera module, which lens hood is configured and arranged to avoid reflections into the first camera module of laterally incident light on the camera system and on the windshield,
   wherein the second camera module is integrated in the lens hood or arranged with a second optical axis of the second camera module oriented through the lens hood toward the windshield, and
   wherein the first and second camera modules are configured and arranged so that when the housing is mounted behind the windshield, the first optical axis is oriented substantially parallel to a longitudinal axis of the vehicle, the second optical axis is oriented substantially upwardly, the first optical axis and the second optical axis cross one another in a space between the housing and the windshield at an angle greater than 45° and less than 90° facing toward the windshield, and the detected area of the windshield covered by the second field of view of the second camera module at least partially overlaps a first area of the windshield covered by the first field of view of the first camera module.

2. The camera system according to claim 1, wherein the lens hood is arranged in the space between the housing and the windshield.

3. The camera system according to claim 1, wherein the first camera module and the second camera module are constructed to respectively detect electromagnetic radiation in different wavelength ranges.

4. The camera system according to claim 1, further comprising at least one active light that emits electromagnetic radiation of a defined wavelength range.

5. The camera system according to claim 4, wherein the active light is arranged so that the electromagnetic radiation emitted by the active light is transferred into the windshield.

6. The camera system according to claim 4, wherein the at least one active light is arranged next to the second camera module, with a direction of emission of the at least one active light being oriented through the lens hood toward the windshield.

7. The camera system according to claim 6, wherein the second camera module and/or the at least one active light is respectively arranged with a respective radiation axis thereof oriented through an aperture in the lens hood.

8. The camera system according to claim 7, further comprising at least one optical element arranged in the aperture of the lens hood.

9. The camera system according to claim 6, wherein the second camera module and/or the at least one active light is respectively arranged with a respective radiation axis thereof oriented through a radiation window portion of the lens hood constructed and adapted to allow electromagnetic radiation to pass through.

10. The camera system according to claim 9, wherein the radiation window portion of the lens hood is constructed and adapted to allow electromagnetic radiation having a defined wavelength range to pass through.

11. The camera system according to claim 1,
   further comprising a shared printed circuit board on which the first camera module and the second camera module are arranged, wherein the printed circuit board is a flexible printed circuit board including a first planar area at right angles to an optical axis of the first camera module, a second planar area below the lens hood, and a curved area connecting the first planar area and the second planar area, and wherein the first camera module is arranged on the first planar area of the flexible printed circuit board, and the second camera module is arranged on the second planar area of the flexible printed circuit board.

12. The camera system according to claim 1,
further comprising a first printed circuit board, a second printed circuit board, and flexible contacts,
wherein the first camera module is arranged on the first printed circuit board and the second camera module is arranged on the second printed circuit board, and
wherein the second printed circuit board is arranged below the lens hood and connected to the first printed circuit board by the flexible contacts.

13. The camera system according to claim 1,
further comprising a printed circuit board on which the first camera module is arranged,
wherein the second camera module is integrated in the lens hood, and
wherein the lens hood is arranged in the camera system such that arranging the lens hood in the camera system establishes a mechanical connection between the lens hood and the housing, and establishes a direct or indirect electrical connection between the second camera module and the printed circuit board.

14. The camera system according to claim 1,
further comprising electronic components configured and adapted to process recorded image data,
wherein the first camera module and the second camera module are both connected to and make shared use of the electronic components.

15. The camera system according to claim 1, wherein the direction of view of the second camera module is not aligned at right angles to the detected windshield area so that only the focused portion of the detected windshield area is imaged as a focused image by the second camera module.

16. The camera system according to claim 1, wherein the second camera module is integrated in the lens hood.

17. The camera system according to claim 1, wherein an opening and/or a radiation window penetrates through the lens hood and a wall of the housing, and wherein the second camera module is arranged inside the housing with the second optical axis of the second camera module oriented through the opening and/or the radiation window through the wall of the housing and the lens hood toward the windshield.

18. The camera system according to claim 1,
wherein the housing includes a first housing wall, a second housing wall, and a housing interior space enclosed inside the housing between the first housing wall and the second housing wall,
wherein the lens hood is arranged extending along a surface of the first housing wall that faces toward the windshield,
wherein the first camera module is received in a first opening in the first housing wall, and
wherein the second camera module is received in a second opening in the first housing wall.

19. A camera system for a vehicle, which is to be arranged inside the vehicle behind a windshield of the vehicle, said camera system comprising:

a housing configured to be mounted behind the windshield;
a first camera module including a first image recording element and a first objective, wherein said first camera module is configured and arranged in said housing so that when said housing is mounted behind the windshield, then a first optical axis and a first field of view of said first camera module are oriented through the windshield into an outside scene in front of the vehicle with said first optical axis oriented substantially parallel to a longitudinal axis of the vehicle, and said first camera module is focused on the outside scene in front of the vehicle so as to record a focused image of the outside scene in said first field of view;
a second camera module including a second image recording element and a second objective, wherein said second camera module is configured and arranged separately from said first camera module in said housing so that when said housing is mounted behind the windshield, then a second optical axis of said second camera module is oriented differently from said first optical axis and substantially upwardly toward the windshield, and said second camera module is focused on a front surface of the windshield so as to record a focused image of the front surface of the windshield in at least a focused portion of a detected area on the front surface of the windshield covered by a second field of view of said second camera module; and
a light shield configured and arranged in a space between said housing and the windshield to prevent scattered, stray or reflected light below said first field of view of said first camera module from entering said first camera module;
wherein said second camera module is integrated in said light shield or arranged with said second optical axis extending through said light shield toward the windshield; and
wherein said first and second camera modules are configured and arranged so that when said housing is mounted behind the windshield, said first optical axis and said second optical axis cross one another in the space between said housing and the windshield at an angle greater than 45° and less than 90° facing toward the windshield, and the detected area on the front surface of the windshield covered by said second field of view of said second camera module at least partially overlaps a first area of the windshield covered by said first field of view of said first camera module.

20. The camera system according to claim 19, wherein said light shield extends along a plane parallel to a plane of said second image recording element of said second camera module.

21. The camera system according to claim 19, wherein said second camera module is integrated in said light shield.

22. The camera system according to claim 19, wherein an opening and/or a radiation window penetrates through said light shield and a wall of said housing, and wherein said second camera module is arranged inside said housing with said second optical axis extending through said opening and/or said radiation window through said wall of said housing and said light shield toward the windshield.

23. The camera system according to claim 19,
wherein said housing includes a first housing wall, a second housing wall, and a housing interior space enclosed inside said housing between said first housing wall and said second housing wall, wherein said light shield is arranged extending along a surface of said first housing wall that faces toward the windshield, wherein said first camera module is received in a first opening in said first housing wall, and wherein said second camera module is received in a second opening in said first housing wall.

\* \* \* \* \*